: 2,902,469
Patented Sept. 1, 1959

2,902,469
LINEAR POLYESTERS

Charles A. Burkhard, Alplaus, N.Y., assignor to General Electric Company, a corporation of New York No Drawing. Application April 13, 1956
Serial No. 578,149

11 Claims. (Cl. 260—47)

This invention relates to linear polyesters and to their preparation. More particularly, this invention relates to linear polyesters prepared from alkoxybenzene dicarboxylic acids and glycols.

Polyesters of the three benzene dicarboxylic acids, phthalic acid, isophthalic acid, and terephthalic acid, with glycols such as ethylene glycol or other polymethylene glycols are known in the art. These polyesters have been used in the formation of fibers, films, coating materials and the like. Although these polyesters of glycols and benzene dicarboxylic acids are satisfactory for many applications, they are somewhat deficient in hydrolytic stability. That is, these polyesters tend to degrade to lower molecular weight materials upon exposure to moisture and when immersed in water. These known polyesters suffer a further disadvantage in that they are difficult to prepare. Thus, particularly with isophthalic acid and terephthalic acid, it is found that the benzene dicarboxylic acids have only a limited solubility in ethylene glycol. Thus, when polyesters are being prepared from one of these dicarboxylic acids and ethylene glycol, for example, a long period of time is necessary to form a homogeneous reaction mixture. This time varies, to some extent, upon the temperature at which polyester formation is attempted and in general is in the region of from 2 to 20 or more hours.

It is an object of this invention to provide fiber-forming and film-forming polyester materials which exhibit increased hydrolytic stability over prior art materials.

It is a further object of this invention to provide fiber-forming and film-forming polyester resins which may be prepared at much faster rates than previously known materials.

These and other objects of my invention are accomplished by forming polyester resins from a methoxybenzene dicarboxylic acid or mixtures of said acids and a glycol.

The term "alkoxybenzene dicarboxylic acid" is intended to refer to compositions having the folowing formula:

(1) 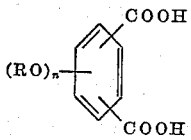

where R is a lower alkyl radical, e.g., methyl, ethyl, propyl, isopropyl, butyl, isobutyl, t-butyl, etc. radicals, and preferably methyl; $n$ is an integer equal to from 1 to 3, inclusive, preferably equal to 1. In Formula 1 where R is methyl and $n$ is equal to 1, it is obvious that the possible alkoxybenzene dicarboxylic acids are 3-methoxyphthalic acid, 4 - methoxyphthalic acid, 2 - methoxyisophthalic acid, 4-methoxyisophthalic acid, 5-methoxyisophthalic acid, and methoxyterephthalic acid.

The term "glycol" as used in the present application is intended to refer to compounds having the formula:

(2) 

where $a$ is an integer equal to from 2 to 10, inclusive, and preferably from 2 to 4. Glycols within the scope of Formula 2 include, for example, ethylene glycol, propylene glycol, trimethylene glycol, butylene glycol, tetramethylene glycol, pentamethylene glycol, etc. The term "glycol" also includes glycol ethers such as, for example, diethylene glycol, triethylene glycol, dipropylene glycol, etc. The preferred specific glycol within the scope of the present invention is ethylene glycol.

The polyester materials prepared according to the present invention are highly polymeric linear polyesters having recurring structural units resulting from the condensation of the dibasic acids of Formula 1 with the glycols of Formula 2. In the case of polyesters prepared from dibasic acids within the scope of Formula 1 and glycols within the scope of Formula 2, the resulting material has recurring structural units of the general formula:

(3) 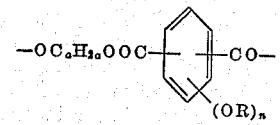

where R, $a$ and $n$ are as previously defined. From the structure shown in Formula 3 it is seen that the polyesters of the present invention are highly polymeric polymethylene methoxyphthalates, polymethylene methoxyisophthalates, and polymethylene methoxyterephthalates.

I have discovered that the presence of the alkoxy group in the aromatic nucleus of the dibasic acid tends to provide film-forming and fiber-forming polyester materials which unexpectedly differ from the materials of the prior art in two important respects. First, the presence of the nuclear-bonded alkoxy radicals tends to increase the hydrolytic stability of the resulting polyester material. Thus, where a polyester material of the present invention such as, for example, polyethylene, 2-methoxyisophthalate resins are compared with prior art polyester materials such as polyethylene isophthalate, it is found that the latter materials tend to hydrolyze at a rate which is more than one-third faster than the rate at which the former compound hydrolyzes. Another unexpected benefit derived from the presence of the nuclear-bonded methoxy radical is the increased solubility of the alkoxybenzene dicarboxylic acid in glycols. Thus, where a mixture of methoxyterephthalic acid with about 50 percent molar excess of ethylene glycol is heated at a temperature of about 200° C., the methoxyterephthalic acid goes into solution in from 10 to 20 minutes. This is in contrast to the extremely long times required for terephthalic acid to go into solution in the same excess of ethylene glycol. Thus, times of from 18 hours to 4 days or more have been required to dissolve terephthalic acid in ethylene glycol.

The highly polymeric polyesters of the present invention may be prepared by heating an alkoxybenzene dicarboxylic acid within the scope of Formula 1 with a glycol of the class described. In carrying out this heating step, the reaction mixture consists of at least one mole of the glycol per mole of the dicarboxylic acid. Preferably an excess of the glycol is used, such as, for example, from 1.5 to 3 and preferably about 2 moles of glycol per mol of the dicarboxylic acid. The heating step may be carried out at any desired temperature. However, since the rate of esterification increases as the temperature increases, it is desirable to carry out the reaction at a temperature of at least 200° C. and generally just below the boiling point of the reaction mixture. Thus, where the glycol employed is ethylene glycol, the heating is generally carried out at a temperature of from about 200-210° C. which is the temperature at which the mixture of the glycol and the dicarboxylic acid boils. As the reaction progresses, the condensation of the dicarboxylic acid with the glycol results in the formation of ester linkages and the formation of water. This water is driven from the reaction mixture by the high temperatures employed.

Since, in the preferred embodiment of this invention, an excess of the glycol is employed, the reaction proceeds in two stages. In the first stage two moles of glycol react with one mole of the aromatic dicarboxylic acid and in the second stage the formation of the polymeric polyester takes place. During the formation of the polymeric polyester the excess glycol tends to evaporate from the reaction mixture. Since it is desirable to remove the excess glycol from the reaction mixture, I prefer to carry out this stage of the reaction under a vacuum to remove the excess glycol as the polymeric polyester is formed. However, it should be understood that the reaction proceeds at a satisfactory rate and to a satisfactory degree of polymerization even when the vacuum is not used. However, when vacuum is not used during the course of the reaction, the excess glycol is desirably removed from the reaction mixture by heating the reactants to a temperature of from 220–250° C. to boil off any excess glycol. Advantageously a vacuum may be applied to the reaction mixture during this devolatilization stage. As the reaction of the present invention proceeds, it is observed that the viscosity of the reaction mixture increases as the degree of polymerization of the reactants increases. Since the polymeric polyesters of the present invention have fiber-forming properties when a high degree of polymerization is obtained, it is desirable to carry out the reaction until the desired degree of polymerization is obtained. Generally, this desired degree of polymerization may be obtained by merely heating the reactants at the initial reaction temperature without the use of vacuum or catalyst. However, for speed of reaction, it is advantageous to employ a vacuum during the reaction and also to employ suitable esterification catalysts.

Although it is impossible to specify an exact molecular weight required of the resins of this invention when they are to be used as fibers, it is preferred to heat the reaction mixture until a product having an average molecular weight of about 3000–6000 is obtained. With average molecular weights of this order the polyester resin may be drawn into strong fibrous materials by the methods hereinafter described.

Suitable esterification catalysts for carrying out my process include lithium, sodium, potassium, calcium, beryllium, magnesium, zinc, cadmium, aluminum, chromium, molybdenum, manganese, iron, cobalt, nickel, copper, silver, mercury, tin, lead, bismuth, antimony, platinum and palladium. These metallic catalysts may be used in any desired form such as in forms such as powder, chips, ribbon, wire, etc. However, the preferred catalysts of the present invention are oxides and salts of metals such as, for example, carbonates, chlorides, acetates, borates, or oxides of materials such as magnesium, lead, cobalt, cerium, or antimony. Suitable catalysts of this type include, for example, magnesium oxide, lead dioxide, cobaltous acetate tetrahydrate, ceric oxide, antimony trioxide, etc.

After formation, the polyester resins of the present invention may be allowed to cool to form tough, transparent resinous materials. These materials may be ground if desired and molded into finished articles by conventional methods. However, because of the film-forming and fiber-forming properties of these resins, they are generally used in the molten state. Thus, where it is desired to form fibers from these polyester resins, the resin is heated to its molten state which may vary from about 100–240° C. depending on the particular reactants employed and the degree of polymerization. At this time filaments of the molten resin may be formed by extrusion and these resulting filaments may be drawn into fibers by conventional cold drawing processes. The term "cold drawing" does not necessarily mean that the resins are actually cold when they are drawn but that no heat is applied to the resinous material during the drawing of the fibers from the filament. It is found that the polyester resins of this invention in filament form may be drawn to more than 10 to 50 times their original length to form highly oriented fibers of macrocrystalline structure. When the resins of this invention are to be employed as films, the films may be formed by conventional film-forming methods which comprise extruding the resinous material into a thick film and drawing the thick film down to the desired thickness to form a highly oriented tough, transparent film material.

The following examples are illustrative of the practice of my invention and are not intended for purposes of limitation. All parts are by weight unless otherwise indicated.

Example 1

This example illustrates the preparation of methoxyterephthalic acid and the formation of a highly polymeric polyester from methoxyterephthalic acid and ethylene glycol. To a mixture of 122 parts of 2,5-dimethylphenol and 45 parts of sodium hydroxide in 500 parts of water was added dropwise with stirring at 0–5° C., 75 parts of dimethylsulfate. After the addition of dimethylsulfate had been completed, the mixture was heated at 80° C. for 10 hours. Ether extraction of the reaction product and distillation of the extract gave 2,5-dimethylanisole which boiled at 107.5° C. at 47 mm. and had a refractive index $n_D^{20}$ 1.5150. About 80 parts of 2,5-dimethylanisole was added dropwise with stirring to a mixture of 200 parts of potassium permanganate and 1 part of sodium hydroxide in 3500 parts of water. The mixture was heated to 80° C. and 400 additional parts of potassium permanganate were added. The resulting mixture was heated for 10 hours at 80° C. giving a precipitate of magnesium dioxide which was separated by filtration. Acidification of the filtrate gave methoxyterephthalic acid, which had a neutral equivalent of 96 compared with the theoretical value of 98. A mixture of 3 parts of methoxyterephthalic acid and 3.33 parts of ethylene glycol was heated at a temperature of 210° C. for 24 hours. During the first 20–30 minutes all of the methoxyterephthalic acid dissolved into the ethylene glycol forming a clear solution. At the end of the 24 hours, ethylene glycol and other low boiling materials were removed from the reaction mixture by heating the reaction products for 2 hours at 230° C. at 1 mm. The resulting resin contained a large number of molecules having a molecular weight in excess of 3000. Fibers were formed from this resin by heating the resin at atmospheric pressure until it became molten and then drawing out filaments of the resin to form fibers. It was found that filaments of the resin could be drawn to about 50 times their original length before breaking.

When cool the resin of this example is a transparent, tough amorphous resin which can be ground in conventional manners and molded into the desired shape with heat and pressure.

Example 2

This example describes the preparation of 2-methoxyisophthalic acid and the preparation of a polyester from the acid and ethylene glycol. The compound 2,6-dimethylanisole was prepared by the method of Example 1 employing 2,6-dimethylphenol in place of the 2,5-dimethylphenol of Example 1. This compound had a boiling point of 99–100° C. at 45 mm. and had a refractive index $n_D^{20}$ 1.5031. Seventy-eight parts of 2,6-dimethylanisole was added dropwise with stirring to a solution of 200 parts of potassium permanganate and 1 part of sodium hydroxide and 3500 parts of water. This solution was maintained at 75–85° C. for 10 hours. During this 10 hour period an additional 200 parts of potassium permanganate were added. This resulted in a solution with a manganese dioxide precipitate. The precipitate was removed by filtration and the filtrate was acidified with cold dilute sulfuric acid to yield 2-methoxyisophthalic acid. This acid had a melting point of 221–222° C. and had a neutral equivalent of 102 as compared with the theoretical value of 98. Two parts of this acid and 3.33 parts of ethylene glycol were heated at about 200° C. for 10 hours. During the initial 15 minutes of the 24 hour period the acid went into solution. At the end of the 24 hour period the excess ethylene glycol was removed by heating the resin for about 15 minutes at 1 mm. The resulting highly polymeric polyethylene 2-methoxyisophthalate formed fibers similar to those observed with the product of Example 1.

Example 3

This example describes the preparation of 4-methoxyisophthalic acid and the formation of a highly polymeric resin from this acid and ethylene glycol. About 75 parts of dimethylsulfate were added to a stirred mixture of 122 parts of 2,4-dimethylphenol and 45 parts of sodium hydroxide in 500 parts of water which was maintained at a temperature of about 0–5° C. This mixture was then heated with stirring at 80° C. at 10 hours and 2,4-dimethylanisole was separated from the reaction mixture by ether extraction and distillation. The 2,4-dimethylanisole had a boiling point of 108.5 to 110.5° C. at 49 mm. and had a refractive index $n_D^{20}$ 1.5142. To a mixture of 158 parts of potassium permanganate and 20 parts of 10 percent sodium hydroxide and 3500 parts of water was added 65.6 parts of 2,4-dimethylanisole. One and one-half hours after the addition of the 2,4-dimethylanisole was completed a second 158 part portion of potassium permanganate was added and after an additional 90 minutes a third portion (140 parts) of potassium permanganate was added. This reaction mixture was held at about 80° C. for an additional 10 hours at which time the precipitated manganese dioxide was removed by filtration and upon acidification 4-methoxyisophthalic acid came down. This acid had a melting point of 275–276° C. and a neutral equivalent of 94 as compared with the theoretical value of 98. A mixture of 3 parts of 4-methoxyisophthalic acid and 2.22 parts of ethylene glycol was heated at 210° C. for 24 hours. The excess ethylene glycol and other volatile products were removed by heating the resulting product for 2 hours at 230° C. at 1 mm. This resulted in a highly polymeric polyethylene 4-methoxyisophthalate which formed fibers.

Example 4

A mixture of 3 parts of 4-methoxyisophthalic acid and 2.22 parts of diethylene glycol was heated at about 200° C. for 24 hours. The excess diethylene glycol and other volatile products were removed by heating the resin for 2 hours at 230° C. at 1 mm. This resulted in a highly polymeric polyester having the following recurring structural units:

(4)
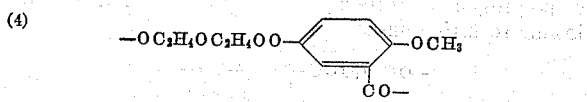

Although the resin formed in this example was somewhat darker than those formed using ethylene glycol as the glycol ingredient, the resulting product formed fibers of high strength.

Example 5

This example illustrates the formation of a highly polymeric polyester resin from 4-methoxyisophthalic acid and trimethylene glycol. About 2 parts of 4-isophthalic acid and 2.22 parts of trimethylene glycol were heated at a temperature of about 200° C. for 24 hours. During the initial 20 minutes of the reaction all of the acid went into solution. At the end of the 24 hour period the resulting product was heated at a temperature of about 250° C. for 30 minutes at 0.1 mm. to drive off any unreacted trimethylene glycol and other volatile products. Fibers having excellent tensile strength were drawn from the molten resin.

Example 6

This example illustrates the use of the catalyst in the formation of the resins of the present invention. About 3 parts of 4-methoxyisophthalic acid, 2.22 parts of ethylene glycol and 0.003 part of cobaltous acetate tetrahydrate were mixed and heated to a temperature of about 200° C. During the first 10 minutes at 200° C. all of the 4-methoxyisophthalic acid went into solution. At the end of about 90 minutes the reaction mixture was devolatilized by heating for about 30 seconds at 0.1 mm. to remove any unreacted ethylene glycol and other volatile products. The resulting highly polymeric polyethylene 4-methoxyisophthalate was formed into filaments which were drawn into fibers having over 50 times the length of the initial filament.

Example 7

A mixture of 3 parts of 5-methoxyisophthalic acid and 2.22 parts of ethylene glycol was heated on an oil bath for 24 hours at 210° C. The 5-methoxyisophthalic acid dissolved in the ethylene glycol during the first 15 minutes of the reaction. At the end of the 24 hour period the resulting product was heated at a temperature of 230° C. at 1 mm. for 2 hours to remove unreacted ethylene glycol and other volatile products. This resulted in highly polymeric polyethylene 5-methoxyisophthalate. This resin formed high tensile strength fibers. Chemical analysis of this resin showed the presence of 58.6 percent carbon as compared with the theoretical value of 59.46 percent carbon. The 5-methoxyisophthalic acid used in this example was prepared by the method of the preceding examples by converting 3,5-dimethylphenol to 3,5-dimethylanisole, which was then converted to the acid. The 5-methoxyisophthalic acid had a melting point of 274–275° C. Chemical analysis of this acid showed a neutralization equivalent of 97 with an analysis of 55.4 percent by weight of carbon and 4.0 percent by weight of hydrogen. Theoretical values are 98 for the theoretical equivalent, 55.11 percent carbon and 4.11 percent hydrogen.

Example 8

One part of 3-methoxyphthalic acid prepared by the oxidation of 5-methoxy-1-naphthol and 4.44 parts of ethylene glycol were heated at about 200° C. for 24 hours. During the first 20 minutes of this reaction all of the acid went into solution. At the end of the 24 hour period the reaction mixture was heated at 200° C. and 1 mm. for 4 hours to remove excess ethylene glycol and other volatile products. The resulting resin was not a fiber-forming material but was a tough, glass-like solid at room temperature.

Example 9

About 2 parts of 4-methoxyphthalic acid prepared by the method described in Example 1, and 3.33 parts of ethylene glycol were heated for 36 hours at 200° C. At the end of this time the excess ethylene glycol and other volatile products were removed by heating the reaction mixture at 200° C. at 1 mm. for 4 hours. The resulting polymeric polyethylene 4-methoxyphthalate was a very viscous syrup at 200° C. and formed a hard, resinous solid at room temperature.

Although the foregoing examples have shown the preparation of highly polymeric polyester resins from a single alkoxybenzene dicarboxylic acid within the scope of Formula 1 and a single glycol, it should be understood that more than one of the acids may be used and also that more than one glycol may be used. In addition, it is possible to modify the highly polymeric polyester resins of this invention with other dibasic acids, either saturated or unsaturated, to form resinous materials useful in the textile and coating arts. Thus, during the resin forming reaction of the present invention suitable dibasic acids may be incorporated into the reaction mixture. Suitable acids include saturated aliphatic dicarboxylic acids such as, for example, malonic, succinic, glutaric, adipic, pimelic, etc. acids. Suitable unsaturated dibasic acids include, for example, fumaric, maleic, mesaconic, itaconic, etc. acids. In addition, these compositions may be modified with aromatic dicarboxylic acids such as, phthalic acid or anhydride, isophthalic acid, terephthalic acid, etc. The following examples show the modification of the resins of the present invention with such dibasic acids.

Example 10

This example illustrates the modification of a polymeric ethylene 4-methoxyisophthalate resin with isophthalic acid. A mixture of 1.5 parts of isophthalic acid, 1.5 parts of 4-methoxyisophthalic acid and 3.33 parts of ethylene glycol was heated at 210° C. for 24 hours. The resulting product was then heated for 2 hours at 230° C. at 1 mm. to remove any unreacted ethylene glycol and other volatile materials. This resulted in a fiber-forming resinous material which was a tough, transparent material at room temperature.

Example 11

This example illustrates the modification of a polyethylene 4-methoxyisophthalate resin with terephthalic acid. A mixture of 1.5 parts of terephthalic acid, 1.5 parts of 4-methoxyisophthalic acid and 3.33 parts of ethylene glycol was heated for 24 hours at 210° C. At the end of this time the reaction mixture was heated for 2 hours at 230° C. and 1 mm. to remove unreacted ethylene glycol and other volatile products. The resulting resin formed fibers of outstanding strength.

Example 12

This example illustrates the modification of a polyethylene methoxyterephthalate resin with maleic anhydride and the cross-linking of the resulting modified material. One part of maleic anhydride, 2 parts of methoxyterephthalic acid and 1.9 parts of ethylene glycol were heated at 203 to 206° C. for 2½ hours. During the initial 45 minutes of the reaction all of the solid products went into solution. After this heating step the resultant product was cooled to room temperature, yielding a clear, yellow, very viscous resin. About 10 parts of tertiary butyl peracetate was added to 650 parts of this resin and the mixture was heated in the absence of air at 140° C. At the end of 1¾ hours a tough, cross-linked polymer was formed. Another portion of the viscous resin (579 parts) was mixed with 6 parts of di-t-butyldi-terephthalate and the mixture was heated at 147° C. This resin gelled in about one-half hour to yield a tough, cross-linked polymer. When the resin forming procedure of this example was repeated using terephthalic acid in place of methoxyterephthalic acid it was found that at the end of 2½ hours only about 5 percent of the terephthalic acid entered into the reaction. This indicates that methoxyterephthalic acid is much easier to react in polyester reactions than terephthalic acid.

Although the foregoing examples have illustrated the use of only a monomethoxybenzene dicarboxylic acid in polyester resin formation, it should be understood that benzene dicarboxylic acids containing more than one methoxy group are also contemplated. Thus, the reaction of the present invention will proceed satisfactorily to form a highly polymeric polyester resin using acids such as 2,4-dimethoxyisophthalic acid, 4,6-dimethoxyisophthalic acid, etc. In addition, alkoxy groups other than methoxy may be employed, for example, ethoxy, propoxy, butoxy, etc.

Although the primary utility of the resinous materials of the present invention is in the formation of fibers which may be incorporated into textile materials and in the formation of unsupported films, it should also be understood that these resinous materials may be employed as insulation for electrical conductors. Thus, where it is desired to use these resins as electrical conductor insulation, the resinous material is heated to a temperature above the melting point and then extruded in a suitable manner over the conductor.

What I claim as new and desire to secure by Letters Patent of the United States is:

1. A polymeric linear polyester having a molecular weight of at least 3,000 and being capable of being cold drawn, said polyester being the product of condensation under heat in the molar ratio of from 1 to 3 mols of a glycol having the formula

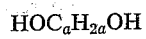

and one mol of an acid selected from the class consisting of isophthalic and terephthalic acids having the formula

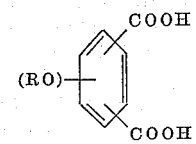

where R is a lower alkyl radical having from 1 to 4 carbon atoms and $a$ is an integer equal to from 2 to 10.

2. The product of claim 1 in which the glycol is ethylene glycol.

3. A highly polymeric linear polyester comprising a resin having a molecular weight of at least 3,000 and being capable of being cold drawn, and consisting essentially of the following recurring structural unit:

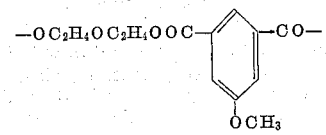

said polyester being the product of condensation under heat in the molar ratio of from 1 to 3 mols diethylene glycol with 1 mol 5-methoxyisophthalic acid.

4. A highly polymeric linear fiber-forming polyester having a molecular weight of at least 3,000 and being capable of being cold drawn, and consisting essentially of polyethylene methoxyterephthalate which has the following recurring structural unit:

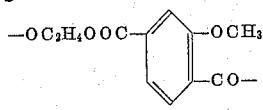

said polyester being the product of condensation under heat in the molar ratio of from 1 to 3 mols ethylene glycol with 1 mol 4-methoxyterephthalic acid.

5. A highly polymeric linear fiber-forming polyester having a molecular weight of at least 3,000 and being capable of being cold drawn, and consisting essentially of polyethylene 4-methoxyisophthalate which has the following recurring unit:

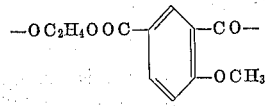

said polyester being the product of condensation under heat in the molar ratio of from 1 to 3 mols ethylene glycol with 1 mol 4-methoxyisophthalic acid.

6. A highly polymeric linear fiber-forming polyester resin having a molecular weight of at least 3,000 and being capable of being cold drawn, and consisting essentially of a polymeric polyethylene 5-methoxyisophthalate which has the following recurring unit:

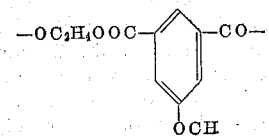

said polyester being the product of condensation under heat in the molar ratio of from 1 to 3 mols ethylene glycol with 1 mol 5-methoxyisophthalic acid.

7. A highly polymeric linear polyester resin having a molecular weight of at least 3,000 and being capable of being cold drawn, and consisting essentially of the condensation product under heat of 4-methoxyisophthalic acid, isophthalic acid, and ethylene glycol, there being present a molar ratio of from 1 to 3 mols ethylene glycol per mol of total molar concentration of 4-methoxyisophthalic acid and isophthalic acid.

8. A highly polymeric linear polyester resin having a molecular weight of at least 3,000 and being capable of being cold drawn, and consisting essentially of the condensation product of methoxyterephthalic acid, terephthalic acid and ethylene glycol, there being employed a molar ratio of from 1 to 3 mols ethylene glycol per mol of total molar concentration of methoxyterephthalic acid and terephthalic acid.

9. A curable polyester composition having a molecular weight of at least 3,000 and being capable of being cold drawn, and consisting essentially of the condensation product under heat of maleic anhydride, methoxyterephthalic acid and ethylene glycol, there being present a molar ratio of from 1 to 3 mols ethylene glycol per mol of total molar concentration of maleic anhydride and methoxyterephthalic acid.

10. The method of forming a linear fiber-forming polyester resin orientable by cold drawing, which comprises heating in the molar ratio of from 1 to 3 mols of a glycol having the formula $$HOC_aH_{2a}OH$$

with one mol of a dibasic acid selected from the class consisting of isophthalic and terephthalic acids having the formula

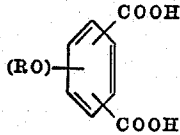

where R is a lower alkyl radical having from 1 to 4 carbon atoms, and $a$ is an integer equal to from 2 to 10, inclusive, said heating being continued until a polyester of at least 3,000 molecular weight is obtained.

11. A polymeric linear polyester having a molecular weight of at least 3,000 and being capable of being cold drawn, said polyester consisting essentially of the recurring structural unit

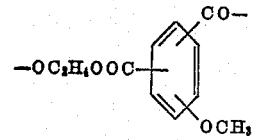

said polyester being the product of condensation under heat in the molar ratio of from 1 to 3 mols ethylene glycol with 1 mol of an acid selected from the class consisting of isophthalic and terephthalic acids having the formula

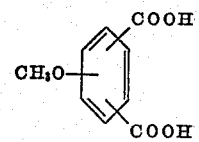

and having a molecular weight of at least 3,000.

References Cited in the file of this patent
UNITED STATES PATENTS

| | | |
|---|---|---|
| 2,035,314 | Hansley et al. | Mar. 24, 1936 |
| 2,662,871 | Bock | Dec. 15, 1953 |
| 2,753,373 | Butchings et al. | July 3, 1956 |
| 2,806,057 | Finch et al. | Sept. 10, 1957 |